US009264744B1

(12) United States Patent
Hundemer

(10) Patent No.: US 9,264,744 B1
(45) Date of Patent: Feb. 16, 2016

(54) USING BLACK-FRAME/NON-BLACK-FRAME TRANSITIONS TO OUTPUT AN ALERT INDICATING A FUNCTIONAL STATE OF A BACK-UP VIDEO-BROADCAST SYSTEM

(71) Applicant: Tribune Broadcasting Company, LLC, Chicago, IL (US)

(72) Inventor: Hank J. Hundemer, Bellevue, KY (US)

(73) Assignee: Tribune Broadcasting Company, LLC, Chicago, IL (US)

( * ) Notice: Subject to any disclaimer, the term of this patent is extended or adjusted under 35 U.S.C. 154(b) by 0 days.

(21) Appl. No.: 14/676,262

(22) Filed: Apr. 1, 2015

(51) Int. Cl.
| | |
|---|---|
| G06K 7/00 | (2006.01) |
| H04N 21/234 | (2011.01) |
| H04N 21/647 | (2011.01) |
| H04N 21/24 | (2011.01) |
| H04N 21/438 | (2011.01) |
| H04N 21/6332 | (2011.01) |
| H04N 21/81 | (2011.01) |
| H04N 17/00 | (2006.01) |

(52) U.S. Cl.
CPC ....... *H04N 21/23418* (2013.01); *H04N 17/004* (2013.01); *H04N 21/2407* (2013.01); *H04N 21/438* (2013.01); *H04N 21/6332* (2013.01); *H04N 21/647* (2013.01); *H04N 21/8126* (2013.01)

(58) Field of Classification Search
CPC ............................................... H04N 21/23418
USPC ......... 235/375, 436; 348/465; 382/2; 700/94; 705/32; 725/107
See application file for complete search history.

(56) References Cited

U.S. PATENT DOCUMENTS

| | | | |
|---|---|---|---|
| 8,643,785 B2 * | 2/2014 | Kurita | H04N 7/0125 348/448 |
| 8,947,595 B1 | 2/2015 | Tucker et al. | |
| 9,010,622 B2 * | 4/2015 | Kim | G06F 17/30879 235/375 |
| 2006/0129822 A1 | 6/2006 | Snijder et al. | |
| 2011/0208744 A1 | 8/2011 | Chandiramani et al. | |
| 2013/0135995 A1 * | 5/2013 | Wu | H04W 40/12 370/229 |

(Continued)

OTHER PUBLICATIONS

Hundemer, Hank J., U.S. Appl. No. 14/676,245, filed Apr. 1, 2015.

(Continued)

*Primary Examiner* — Seung Lee
(74) *Attorney, Agent, or Firm* — McDonnell Boehnen Hulbert & Berghoff LLP

(57) ABSTRACT

In one aspect, an example method for outputting an alert indicating a functional state of a back-up video-broadcast system involves: a computing device receiving a first video-stream that represents first video-content; the computing device generating a first signature based, at least in part, upon an extent of black-frame/non-black-frame transitions included within the first video-content; the computing device receiving a second video-stream that represents second video-content; the computing device generating a second signature based, at least in part, upon an extent of black-frame/non-black-frame transitions included within the second video-content; the computing device making a determination that the generated first-signature and the generated second-signature lack a threshold extent of similarity; and responsive to the determination that the generated first-signature and the generated second-signature lack the threshold extent of similarity, the computing device outputting an alert.

20 Claims, 6 Drawing Sheets

(56) References Cited

U.S. PATENT DOCUMENTS

2013/0163957 A1 6/2013 Ikizyan et al.
2014/0259041 A1* 9/2014 Sharifi ................ H04N 21/233
                                                      725/18

OTHER PUBLICATIONS

Hundemer, Hank J., U.S. Appl. No. 14/676,256, filed Apr. 1, 2015.
Hundemer, Hank J., U.S. Appl. No. 14/676,297, filed Apr. 1, 2015.
Hundemer, Hank J., U.S. Appl. No. 14/676,276, filed Apr. 1, 2015.
Hundemer, Hank J., U.S. Appl. No. 14/676,319, filed Apr. 1, 2015.
Hundemer, Hank J., U.S. Appl. No. 14/676,293, filed Apr. 1, 2015.
Non-Final Office Action mailed Nov. 19, 2015 of U.S. Appl. No. 14/676,297, filed Apr. 1, 2015.
Non-Final Office Action mailed Nov. 24, 2015 of U.S. Appl. No. 14/676,319, filed Apr. 1, 2015.

* cited by examiner

500

| TIME (HH:MM:SS:FF) | TYPE |
|---|---|
| 04:00:00:00 | TO BLACK-FRAME |
| 04:07:00:08 | TO NON-BLACK-FRAME |
| 04:07:30:02 | TO BLACK-FRAME |

| TIME (HH:MM:SS:FF) | TYPE |
|---|---|
| 04:00:00:00 | TO BLACK-FRAME |
| 04:07:00:08 | TO NON-BLACK-FRAME |
| 04:08:30:04 | TO BLACK-FRAME |

Figure 6

USING BLACK-FRAME/NON-BLACK-FRAME TRANSITIONS TO OUTPUT AN ALERT INDICATING A FUNCTIONAL STATE OF A BACK-UP VIDEO-BROADCAST SYSTEM

USAGE AND TERMINOLOGY

Throughout this application, with respect to all reasonable derivatives of such terms, and unless otherwise specified (and/or unless the particular context clearly dictates otherwise), each usage of "a" or "an" means at least one, and each usage of "the" means the at least one.

BACKGROUND

Unless otherwise indicated herein, the materials described in this section are not prior art to the claims in this disclosure and are not admitted to be prior art by inclusion in this section.

A video-broadcast system may be configured to generate and broadcast a video stream to a set of receivers (e.g., set-top boxes) for viewing by end-users. In some instances, two different video-broadcast systems (a primary and a back-up) may be configured to generate the same (or substantially the same) video streams at the same (or substantially the same) time. As such, the primary and back-up systems may generate primary and back-up streams, respectively. With this arrangement, the primary system may broadcast the primary stream to the set of receivers unless and until the primary system becomes inoperative, in which case the back-up system may take over and broadcast the back-up stream to the set of receivers instead.

SUMMARY

In a first aspect, an example method for outputting an alert indicating a functional state of a back-up video-broadcast system involves: a computing device receiving a first video-stream that represents first video-content; the computing device generating a first signature based, at least in part, upon an extent of black-frame/non-black-frame transitions included within the first video-content; the computing device receiving a second video-stream that represents second video-content; the computing device generating a second signature based, at least in part, upon an extent of black-frame/non-black-frame transitions included within the second video-content; the computing device making a determination that the generated first-signature and the generated second-signature lack a threshold extent of similarity; and responsive to the determination that the generated first-signature and the generated second-signature lack the threshold extent of similarity, the computing device outputting an alert.

In a second aspect, a method for outputting an alert indicating a functional state of a back-up video-broadcast system involves: a computing device receiving a first video-stream that represents first video-content; the computing device generating a first signature based, at least in part, upon an extent of black-frame/non-black-frame transitions included within the first video-content; the computing device receiving a second signature based, at least in part, upon an extent of black-frame/non-black-frame transitions included within second video-content represented by a second video-stream; the computing device making a determination that the generated first-signature and the received second signature lack a threshold extent of similarity; and responsive to the determination that the generated first-signature and the received second signature lack the threshold extent of similarity, the computing device outputting an alert.

In a third aspect, a non-transitory computer-readable medium has stored thereon program instructions that when executed cause a computing device to perform of a set of acts for outputting an alert indicating a functional state of a back-up video-broadcast system. The set of acts involve: receiving a first video-stream that represents first video-content; generating a first signature based, at least in part, upon an extent of black-frame/non-black-frame transitions included within the first video-content; receiving a second signature based, at least in part, upon an extent of black-frame/non-black-frame transitions included within second video-content represented by a second video-stream; making a determination that the generated first-signature and the received second signature lack a threshold extent of similarity; and responsive to the determination that the generated first-signature and the received second signature lack the threshold extent of similarity, outputting an alert.

BRIEF DESCRIPTION OF THE DRAWINGS

FIG. 5 is a simplified diagram of an example black-frame/non-black-frame transition signature according to the present disclosure.

FIG. 6 is a simplified diagram of another example black-frame/non-black-frame transition signature according to the present disclosure.

DETAILED DESCRIPTION

I. Overview

Figure 1:
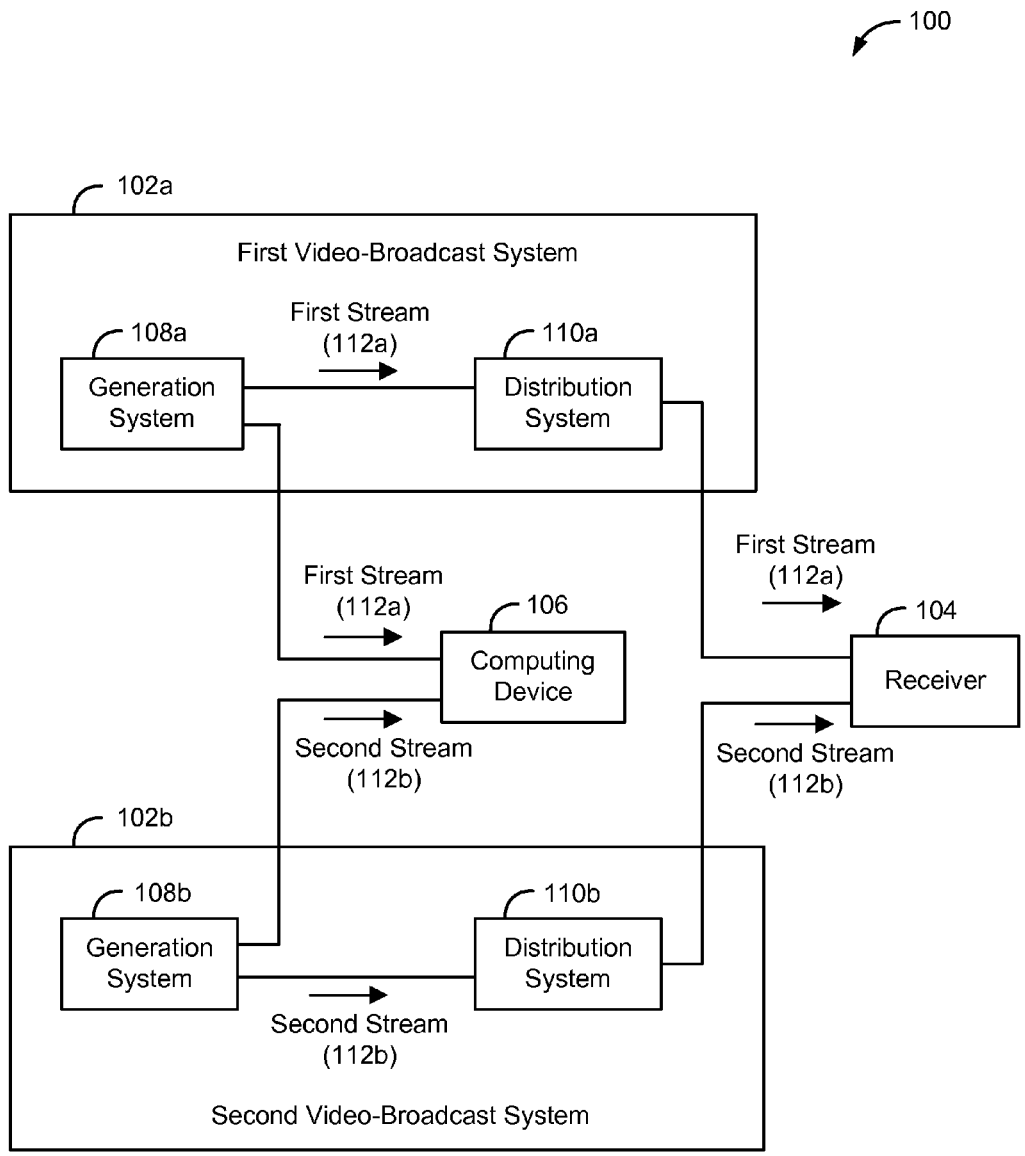
FIG. 1 is a simplified block diagram illustrating an example system according to the present disclosure.

As indicated above, in some instances, primary and back-up systems may generate primary and back-up video streams, respectively, and in the event that the primary system becomes inoperable, the back-up system may broadcast the back-up stream to take the place of the primary stream. Given this, at any given time, it may be desirable to determine a functional state of the back-up system. In particular, it may be desirable to determine whether the back-up system is in fact generating a back-up stream, thus allowing the back-up system to take over if necessary. In the event that the back-up system is not generating a back-up stream, it may be desired to output an alert so that the issue with the back-up system can be addressed.

One approach for determining a functional state of the back-up system involves a computing device conducting a bit-by-bit comparison of a primary stream and a corresponding purported back-up stream to determine whether the streams are exact copies of each other. After making this comparison, if the device determines that there is a discrepancy between the two streams, the device may output an alert (i.e., to indicate that the back-up system is not functioning properly).

However, in some cases, this approach may not provide useful results. This may be the case where the two streams are not identical, but where they represent respective portions of video content that are perceptually indistinguishable from each other (from the perspective of a typical end-user). Such streams may not be identical for a variety of reasons, such as due to a digital signal processing artifact that is present in one stream, but not in the other. Given this scenario, despite the fact that the back-up system is generating a back-up stream that should be considered to be an acceptable back-up of the primary stream, due to the nature of the bit-by-bit comparison, the device may nonetheless output an alert.

The present disclosure provides an alternative and improved approach for determining a functional state of a back-up system, and for outputting an alert indicating the functional state, and is based, at least in part, on a consideration of an extent of black-frame/non-black-frame transitions occurring in video content.

As used herein, the term "black frame" refers to a frame of video content that lacks traditionally substantive content and that is perceptually generally black. Notably, due to the presence of static or noise in a frame (that may result in random white or gray pixels), a black frame need not consist of true black pixels. On the other hand, the term "non-black-frame" refers to a frame that is not a black frame. As such, a frame that is primarily black, but that includes some traditionally substantive content (e.g., white movie credits on a black background), would be considered a non-black-frame.

The term "black-frame/non-black-frame transition" refers to an instance where a black frame is followed immediately by a non-black frame (referred to herein as a "to-non-black-frame transition"), or an instance where a non-black-frame is followed immediately by a black frame (referred to herein as a "to-black-frame-transition"). These types of transitions may occur in a variety of situations. For example, where video content transitions from a show segment portion to a commercial portion, a short (e.g., 1 second) set of black frames may serve as a buffer to separate the show segment portion from the commercial portion, and thus, a to-black-frame transition may occur between the last frame of the show segment portion and the first frame of the buffer. Likewise, a to-non-black-frame transition may occur between the last frame of the buffer and the first frame of the commercial portion.

In one aspect, disclosed is a method that involves a computing device receiving a first video-stream and a second video-stream, one being a primary stream, and the other being a corresponding purported back-up stream. The first stream represents first video-content and the second stream represents second video-content.

The method further involves the device generating a first signature based, at least in part, upon an extent of black-frame/non-black-frame transitions included within the first video-content, and generating a second signature based, at least in part, upon an extent of black-frame/non-black-frame transitions included within the second video-content. Accordingly, the signatures may indicate one or more occurrences within the respective video content where a black-frame/non-black-frame transition occurs.

The method further involves the device making a determination that the generated first-signature and the generated second-signature lack a threshold extent of similarity, and, responsive to the determination, the device outputting an alert. As compared to the bit-by-bit comparison approach described above, by generating and comparing signatures based on black-frame/non-black-frame transitions of the represented content, the device may more accurately determine whether or not a purported back-up stream is in fact a back-up stream. Indeed, in the case where the first and second streams are not identical, but where they represent respective portions of video content that are perceptually indistinguishable from each other, the portions are likely to have the same (or similar) signatures based on black-frame/non-black-frame transitions, and therefore, in accordance with the disclosed technique, the device may appropriately forgo outputting an alert. On the other hand, in the case where the respective portions of video content are perceptually distinguishable from each other, in accordance with the disclosed technique, the device may appropriately output an alert (i.e., to indicate that the back-up system is not functioning properly).

II. Example System

FIG. 1 is a simplified block diagram illustrating an example system 100. The system 100 may include at least two video-broadcast systems, including a first system 102a and a second system 102b. One of the first and second systems 102a, 102b may serve as a primary system, and other may serve as a back-up system. The system 100 may further include a receiver 104, and a computing device 106.

The first system 102a may include a generation system 108a and a distribution system 110a. The generation system 108a may be configured for generating a first video-stream 112a, and may include various components, including for example a video source, a router, a switcher, and/or a broadcast automation system. The generation system 108a may be connected to the distribution system 110a, which in turn may be connected to the receiver 104. The distribution system 110a may be configured for distributing the first stream 112a to the receiver 104. The distribution system 110a may include various components such as a terrestrial antenna or a satellite, and may be configured for distributing the first stream 112a to the receiver 104 in a variety of ways (e.g., over the air transmission). The receiver 104 may take a variety of forms, including for example, a television or a television set-top box.

The second system 102b may be configured in a same or similar manner to that of the first system 102a. As such, the second system 102b may include a generation system 108b and a distribution system 110b. The generation system 108b may be configured for generating a second video-stream 112b, and may include various components, including for example a media source, a router, a switcher, and/or a broadcast automation system. The generation system 108b may be connected to the distribution system 110b, which in turn may be connected to the receiver 104. The distribution system 110b may be configured for distributing the second stream 112b to the receiver 104. The distribution system 110b may include various components such as a terrestrial antenna or a satellite, and may be configured for distributing the second stream 112b to the receiver 104 in a variety of ways.

While the generation system 108 may generate the first stream 112a and the generation system 108b may generate the second stream 112b at or about the same time, the system 100 may be configured such that only one of the distribution systems 110a, 110b distributes its respective generated stream to the receiver 104 at a given time. In practice, provided the first system 102a is operational, the distribution system 110a may distribute the first stream 112a to the receiver 104, unless and until the first system 102b becomes inoperative, in which case the second system 102b may take over and the distribution system 110b may distribute the second stream 112b to the receiver 104 instead. In this scenario, the first system 102a may be considered the primary system and the second system 102b may be considered the back-up system. Likewise, the first stream 112a may be considered the primary stream, and the second stream 112b may be considered the back-up stream.

Given the possibility of the second system 102b taking over for the first system 102a, at any given time, it may be desirable to determine a functional state of the second system 102b. In particular, it may be desirable to determine whether the second system 102b is in fact generating a back-up stream, thus allowing the second system 102b to take over if necessary. In the event that the second up system 102b is not generating a back-up stream, it may be desired to generate alert so that the issue with the second system 102b can be addressed (e.g., by an operator or automatically by another system).

The device 106 may be configured to generate such an alert. The device 106 may be connected to both generation systems 108b, 108b. With this arrangement, the device 106 may receive the first stream 112a and the second stream 112b, and for each stream, generate a respective signature based, at least in part, upon an extent of black-frame/non-black-frame transitions included within content represented by the respective stream. Further, the device 106 may make a determination that the generated signatures lack a threshold extent of similarity, and in response to the determination, the device 106 may output an alert.

In some examples, a video-broadcast system may be integrated with an audio-broadcast system, such that a video stream representing video content may be broadcast together with an audio stream representing corresponding audio content. In some instances, the video stream and the audio stream may be combined into a single media stream.

Figure 2:
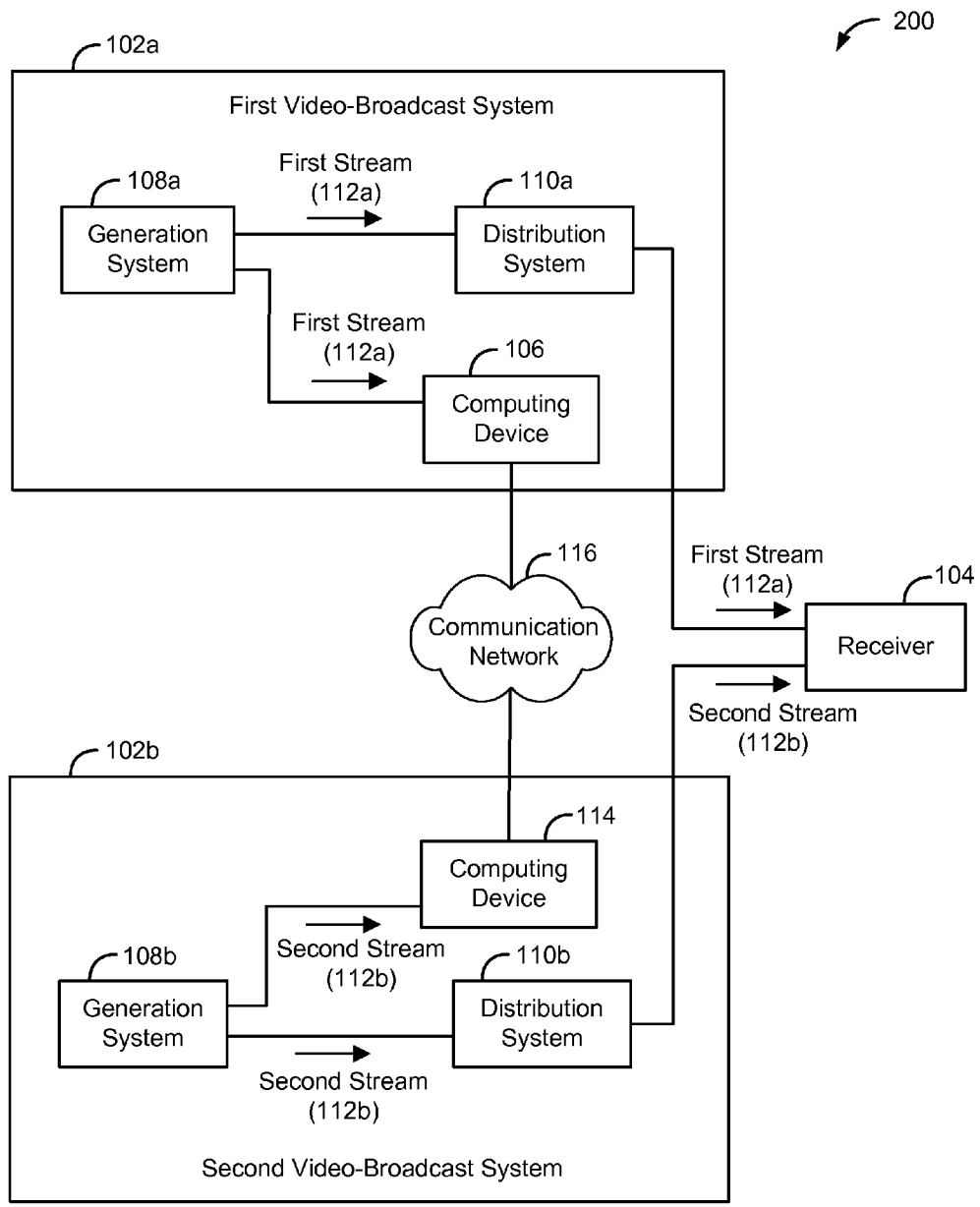
FIG. 2 is a simplified block diagram illustrating another example system according to the present disclosure.

FIG. 2 is a simplified block diagram illustrating an example system 200. The system 200 may be the same as or similar to the system 100, except that the system 200 includes another computing device 114, and a communication network 116 connecting the device 106 and the device 114, and through which the device 106 and the device 114 may communicate. The device 114 is also connected to the generation system 108b. The communication network 116 may take a variety of forms. For example, the communication network 116 may be a packet-switched network such as the Internet.

With this arrangement, the device 106 may receive the first stream 112a, and generate a first signature based, at least in part, upon an extent of black-frame/non-black-frame transitions included within content represented by the first stream 112a. Further, the device 114 may receive the second stream 112b, and generate a second signature based, at least in part, upon an extent of black-frame/non-black-frame transitions included within content represented by the second stream 112b. The device 114 may transmit the generated second-signature to the device 106, and the device 106 may receive the same. The device 106 may then make a determination that the generated first-signature and the received second signature lack a threshold extent of similarity, and in response to the determination, the device 106 may output an alert.

Figure 3:
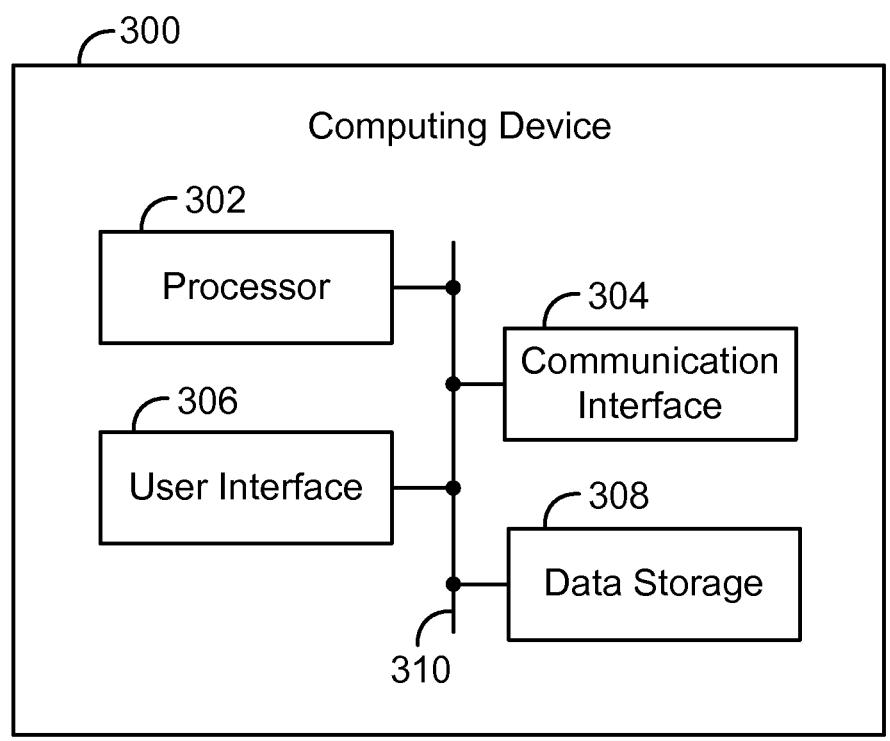
FIG. 3 is a simplified block diagram illustrating an example computing device according to the present disclosure.

FIG. 3 is a simplified block diagram illustrating an example computing device 300. The device 300 may represent the device 106 or the device 114, for instance. The device 300 may be configured for performing a variety of functions or acts, such as those described in this disclosure (including the accompanying drawings). The device 300 may include various components, including for example, a processor 302, a communication interface 304, a user interface 306, and a data storage 308. The components of the device 300 may be communicatively connected to each other (or other devices or systems) via a system bus, network, or other connection mechanism 310.

The processor 302 may include a general purpose processor (e.g., a microprocessor) and/or a special purpose processor (e.g., a digital signal processor (DSP)).

The communication interface 304 may be configured to allow the device 300 to communicate with one or more devices (or systems) according to one or more protocols. In one example, the communication interface 304 may be a wired interface, such as an Ethernet interface or a high-definition serial-digital-interface (HD-SDI). As another example, the communication interface 304 may be a wireless interface, such as a cellular or WI-FI interface.

The user interface 306 may facilitate interaction with a user of the device, if applicable. As such, the user interface 306 may include input components such as a keyboard, a keypad, a mouse, a touch-sensitive panel, a microphone, and a camera, and output components such as a display screen (which, for example, may be combined with a touch-sensitive panel), a sound speaker, and a haptic feedback system.

The data storage 308 may include one or more volatile, non-volatile, removable, and/or non-removable storage components, such as magnetic, optical, or flash storage, and may be integrated in whole or in part with the processor 302. Further, the data storage 308 may take the form of a non-transitory computer-readable storage medium, having stored thereon program instructions (e.g., compiled or non-compiled program logic and/or machine code) that, when executed by the processor 302, cause the device 300 to perform one or more functions or acts, such as those described in this disclosure. Such program instructions may define or be part of a discrete software application that can be executed in response to certain inputs received from the user interface 306, for instance. The data storage 308 may also store other types of information or data, such as those types described throughout this disclosure.

III. Example Operations

Figure 4:
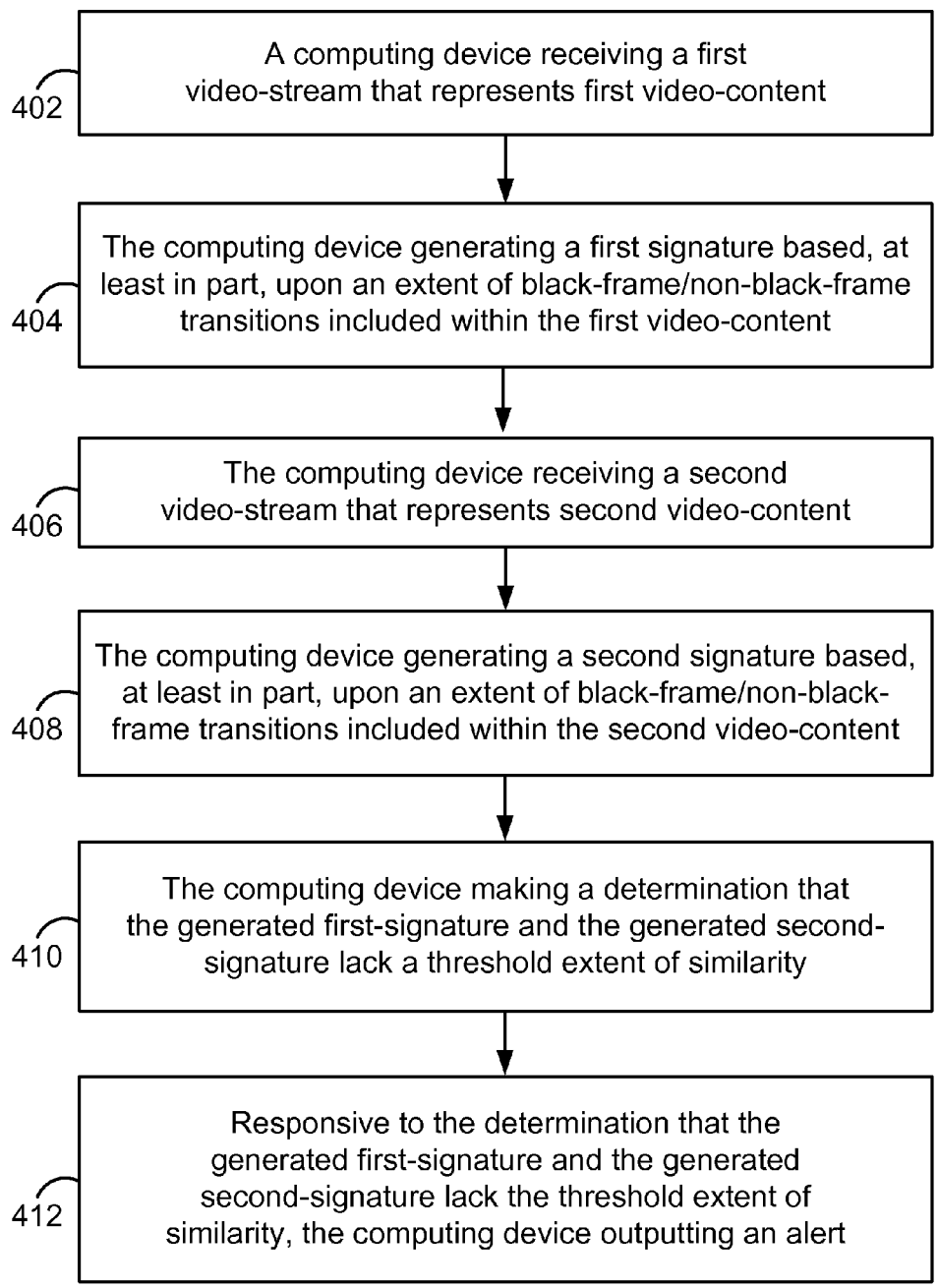
FIG. 4 is a flow chart illustrating an example method according to the present disclosure.

FIG. 4 is a flow chart illustrating an example method 400. At block 402, the method may involve a computing device receiving a first video-stream that represents first video-content. For instance, this may involve the device 106 receiving the first stream 112a from the generation system 108a.

At block 404, the method may involve the computing device generating a first signature based, at least in part, upon an extent of black-frame/non-black-frame transitions included within the first video-content. For instance, this may involve the device 106 generating the first signature based, at least in part, upon an extent of black-frame/non-black-frame transitions included within video-content of the first stream 112a. In one example, the device 106 may store data representing the generated first-signature in data storage.

The act of generating the first signature may involve identifying a black-frame/non-black-frame transition within the first video-content. This may be accomplished using any technique for identifying black-frame/non-black-frame transitions as known in the art. In one example, this may involve identifying a black-frame/non-black-frame attribute for each frame of the first video-content, and then comparing respective attributes of adjacent frames to determine where black-frame/non-black-frame transitions between adjacent frames occur (and/or what types of black-frame/non-black-frame transitions they are). An example technique for identifying a black-frame/non-black-frame attribute of a frame is described in U.S. patent application Ser. No. 13/629,405 entitled "Systems and Methods for Identifying a Black/Non-Black Frame Attribute," which is hereby incorporated by reference herein in its entirety.

The act of generating the first signature may also involve determining a type of the identified black-frame/non-black-frame transition. The identified type may be, for example, "to black-frame" (which may also be referred to as "from non-black-frame") or "to non-black-frame" (which may also be referred to as from "black frame"). The act of generating the first signature may further involve determining a time associated with the identified black-frame/non-black-frame transition. In one example, the device 106 may utilize a time synchronization service (e.g., a global positioning system (GPS) time synchronization service), to determine a time at which playout of the black-frame/non-black-frame transition occurs. The time may be represented in a variety of formats, such as by specifying a number of hours, minutes, seconds, and frames (which is commonly represented in HH:MM:SS:FF format).

Depending on the manner in which the first signature is generated, the first signature may represent a time of and/or a type of one or more black-frame/non-black-frame transitions. Notably, in the case where the first video-stream does not include any black-frame/non-black-frame transitions, the first signature may indicate that no such black-frame/non-black-frame transitions are present.

FIG. 5 depicts an example first signature 500 in the form of a table with columns for TIME (in HH:MM:SS:FF format) and TYPE. As shown, the first signature 500 includes an indication of three black-frame/non-black-frame transitions (each represented as a row), namely a TO BLACK-FRAME transition occurring at time 04:00:00:00, a TO NON-BLACK-FRAME transition occurring at time 04:07:00:08, and a TO BLACK-FRAME transition occurring at time 04:07:30:02.

At block 406, the method may involve the computing device receiving a second video-stream that represents second video-content. For instance, this may involve the device 106 receiving the second stream 112b from the generation system 108b.

At block 408, the method may involve the computing device generating a second signature based, at least in part, upon an extent of black-frame/non-black-frame transitions included within the second video-content. For instance, this may involve the device 106 generating the second signature based, at least in part, upon an extent of black-frame/non-black-frame transitions included within video-content of the second stream 112b. In one example, the device 106 may store data representing the generated second-signature in data storage.

The device 106 may generate the second signature in a same or a similar manner as that in which it generates the first signature. FIG. 6 depicts an example second signature 600 again in the form of a table with columns for TIME (in HH:MM:SS:FF format) and TYPE. As shown, the second signature 600 includes an indication of three black-frame/non-black-frame transitions (each represented as a row), namely a TO BLACK-FRAME transition occurring at time 04:00:00:00, a TO NON-BLACK-FRAME transition occurring at time 04:07:00:08, and a TO BLACK-FRAME transition occurring at time 04:08:30:04.

At block 410, the method may involve the computing device making a determination that the generated first-signature and the generated second-signature lack a threshold extent of similarity. For instance, this may involve the device 106 making a determination that the first signature 500 and the second signature 600 lack a threshold extent of similarity.

The threshold extent of similarity may be based on a variety of factors, such as the existence of one or more transitions, and/or the type or time associated with any such transitions. For instance, the device 106 may make the determination that the generated first-signature and the generated second-signature lack a threshold extent of similarity if there is any type of transition represented in the first signature that is not represented in the second signature.

Additionally or alternatively, the device 106 may make the determination that the generated first-signature and the generated second-signature lack a threshold extent of similarity if there is any type of transition, associated with a first time, represented in the first signature that is not represented in the second signature and associated with a second time within a tolerance period of the first time. As such, in the case where the tolerance period is one minute, the device 106 may determine that the first signature 500 and the second signature 600 lack a threshold extent of similarity because the TO BLACK-FRAME transition at 04:07:30:02 represented by the first signature 500 is not represented in the second signature 600 within that one minute range. Notably though, in the case where the tolerance period is ninety seconds, the device 106 may determine that the first signature 500 and the second signature 600 have a threshold extent of similarity because the TO BLACK-FRAME transition at 04:07:30:02 represented by the first signature 500 is represented in the second signature 600 at 04:08:30:04, which is within the ninety second tolerance period.

At block 412, the method may involve responsive to the determination that the generated first-signature and the generated second-signature lack the threshold extent of similarity, the computing device outputting an alert. For instance, this may involve responsive to the determination that the first-signature 500 and the second-signature 600 lack the threshold extent of similarity, the device 106 outputting an alert.

The act of outputting an alert may take a variety of forms. For instance, this may involve the device 106 displaying a message. Alternatively or additionally, this may involve the device 106 transmitting an instruction to another system or device. Such an instruction may cause the system or device to initiate a diagnostic and/or repair process in connection with the second system 102b.

Figure 7:
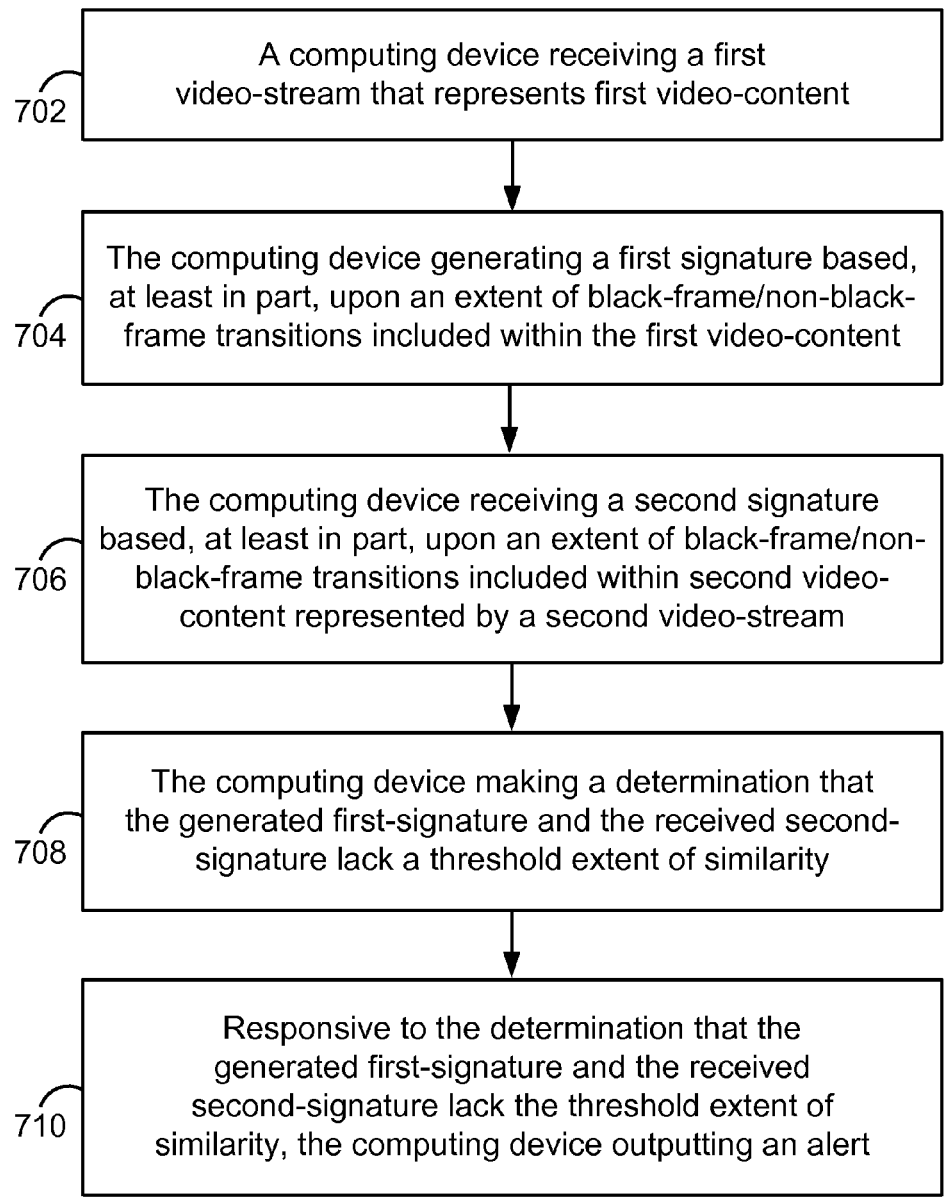
FIG. 7 is a flow chart illustrating another example method according to the present disclosure.

FIG. 7 is a flow chart illustrating an example method 700. At block 702, the method may involve a computing device receiving a first video-stream that represents first video-content. For instance, this may involve the device 106 receiving the first stream 112a from the generation system 108a.

At block 704, the method may involve the computing device generating a first signature based, at least in part, upon an extent of black-frame/non-black-frame transitions included within the first video-content. For instance, this may involve the device 106 generating the first signature based, at least in part, upon an extent of black-frame/non-black-frame transitions included within video-content of the first stream 112a.

At block 706, the method may involve the computing device receiving a second signature based, at least in part, upon an extent of black-frame/non-black-frame transitions included within second video-content represented by a second video-stream. For instance, this may involve the device 106 receiving from the device 114 via the communication network 116, a second signature based, at least in part, upon an extent of black-frame/non-black-frame transitions included within the video content represented by the second stream 112b.

At block 708, the method may involve the computing device making a determination that the generated first-signature and the received second signature lack a threshold extent of similarity. For instance, this may involve the device 106 making a determination that the first signature 500 and the second signature 600 lack a threshold extent of similarity.

At block 710, the method may involve responsive to the determination that the generated first-signature and the received second signature lack the threshold extent of similarity, the computing device outputting an alert. For instance, this may involve responsive to the determination that the first-signature 500 and the second-signature 600 lack the threshold extent of similarity, the device 106 outputting an alert.

The variations discussed above in connection with the method 400 are also applicable in connection with the example method 700.

IV. Example Variations

While one or more acts have been described as being performed by certain devices, systems, or entities (e.g., the computing device 106), the acts may be performed by any device, system, or entity, such as those described in connection with the first system 100 or the second system 200. Furthermore, the devices and systems need not be discrete entities. Some or all of the devices or systems may be combined in a single device.

In addition, the acts described herein need not be performed in the disclosed order, although in some examples and order may be preferred. Also, not all acts need to be performed to achieve the desired advantages of the disclosed systems, devices, and methods, and therefore not all acts are required. Variations discussed in connection with one example may be applied to all other examples disclosed herein.

While select examples of the present disclosure have been described, alterations and permutations of these examples will be apparent to those of ordinary skill in the art. Other changes, substitutions, and alterations are also possible without departing from the invention on its broader aspects as set forth in the following claims.

The invention claimed is:

1. A method for outputting an alert indicating a functional state of a back-up video-broadcast system, the method comprising:

a computing device receiving a first video-stream that represents first video-content;

the computing device generating a first signature based, at least in part, upon an extent of black-frame/non-black-frame transitions included within the first video-content;

the computing device receiving a second video-stream that represents second video-content;

the computing device generating a second signature based, at least in part, upon an extent of black-frame/non-black-frame transitions included within the second video-content;

the computing device making a determination that the generated first-signature and the generated second-signature lack a threshold extent of similarity; and responsive to the determination that the generated first-signature and the generated second-signature lack the threshold extent of similarity, the computing device outputting an alert.

2. The method of claim 1, wherein generating the first signature comprises identifying a black-frame/non-black-frame transition within the first video-content.

3. The method of claim 2, wherein generating the first signature comprises determining a type of the identified black-frame/non-black-frame transition.

4. The method of claim 2, wherein generating the first signature comprises determining a playout time of the identified black-frame/non-black-frame transition.

5. The method of claim 1, wherein the generated first-signature represents a first transition that has a first type and that is associated with a first time, wherein making the determination that the generated first-signature and the generated second-signature lack a threshold extent of similarity comprises determining that the generated second-signature does not represent a second transition that has the first type and that is associated with a time that is within a tolerance period of the first time.

6. The method of claim 1, wherein outputting an alert comprises displaying a message.

7. The method of claim 1, wherein outputting an alert comprises transmitting an instruction.

8. A method for outputting an alert indicating a functional state of a back-up video-broadcast system, the method comprising:

a computing device receiving a first video-stream that represents first video-content;

the computing device generating a first signature based, at least in part, upon an extent of black-frame/non-black-frame transitions included within the first video-content;

the computing device receiving a second signature based, at least in part, upon an extent of black-frame/non-black-frame transitions included within second video-content represented by a second video-stream;

the computing device making a determination that the generated first-signature and the received second signature lack a threshold extent of similarity; and responsive to the determination that the generated first-signature and the received second signature lack the threshold extent of similarity, the computing device outputting an alert.

9. The method of claim 8, wherein generating the first signature comprises identifying a black-frame/non-black-frame transition within the first video-content.

10. The method of claim 9, wherein generating the first signature comprises determining a type of the identified black-frame/non-black-frame transition.

11. The method of claim 9, wherein generating the first signature comprises determining a time associated with the identified black-frame/non-black-frame transition.

12. The method of claim 9, wherein the generated first-signature represents a first transition that has a first type and that is associated with a first time, wherein making the determination that the generated first-signature and the generated second-signature lack a threshold extent of similarity comprises determining that the generated second-signature does not represent a second transition that has the first type and that is associated with a time that is within a tolerance period of the first time.

13. The method of claim 9, wherein outputting an alert comprises displaying a message.

14. The method of claim 9, wherein outputting an alert comprises transmitting an instruction.

15. A non-transitory computer-readable medium having stored thereon program instructions that when executed cause a computing device to perform of a set of acts for outputting an alert indicating a functional state of a back-up video-broadcast system, the set of acts comprising:

receiving a first video-stream that represents first video-content;

generating a first signature based, at least in part, upon an extent of black-frame/non-black-frame transitions included within the first video-content;

receiving a second signature based, at least in part, upon an extent of black-frame/non-black-frame transitions included within second video-content represented by a second video-stream;

making a determination that the generated first-signature and the received second signature lack a threshold extent of similarity; and responsive to the determination that the generated first-signature and the received second signature lack the threshold extent of similarity, outputting an alert.

16. The non-transitory computer-readable medium of claim 15, wherein generating the first signature comprises identifying a black-frame/non-black-frame transition within the first video-content.

17. The non-transitory computer-readable medium of claim 15, wherein generating the first signature comprises determining a type of the identified black-frame/non-black-frame transition.

18. The non-transitory computer-readable medium of claim 15, wherein generating the first signature comprises determining a playout time of the identified black-frame/non-black-frame transition.

19. The non-transitory computer-readable medium of claim 15, wherein the generated first-signature represents a first transition that has a first type and that is associated with a first time, wherein making the determination that the generated first-signature and the generated second-signature lack a threshold extent of similarity comprises determining that the generated second-signature does not represent a second transition that has the first type and that is associated with a time that is within a tolerance period of the first time.

20. The non-transitory computer-readable medium of claim 15, wherein outputting an alert comprises displaying a message.

* * * * *